Patented Sept. 19, 1933

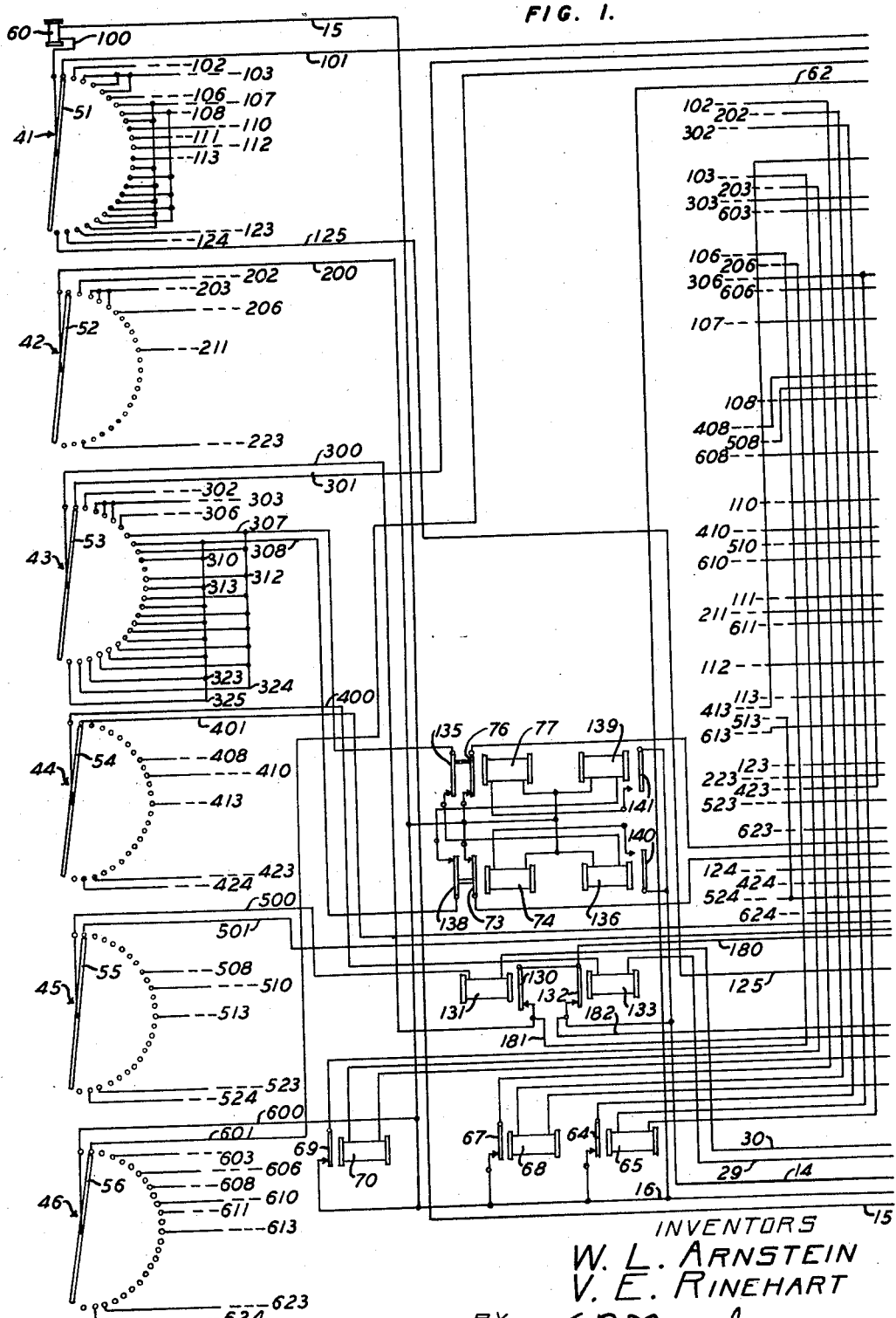

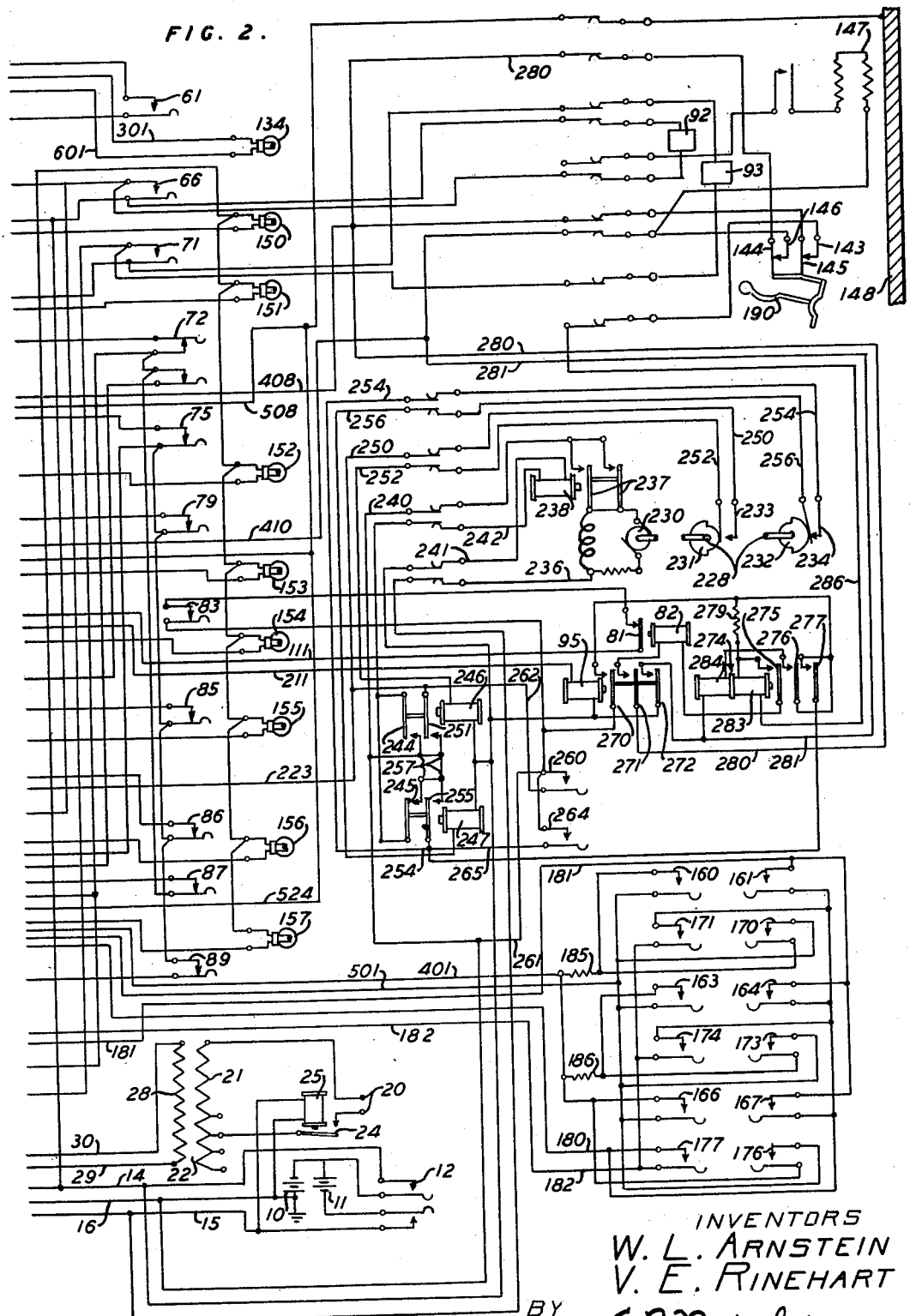

1,927,058

UNITED STATES PATENT OFFICE 1,927,058

METHOD OF AND APPARATUS FOR TESTING

Walter L. Arnstein, White Plains, N. Y., and Vene E. Rinehart, Boonton, N. J., assignors to Western Electric Company, Incorporated, New York, N. Y., a corporation of New York Application April 8, 1932. Serial No. 603,990

14 Claims. (Cl. 179—175)

This invention relates to methods of and apparatus for testing, and more particularly to the testing of coin operated telephone subscriber's sets.

An object of the invention is to automatically test in succession a plurality of electrical circuits for predetermined characteristics.

In the preferred embodiment of the invention, a rotary stepping switch, successively and in accordance with a predetermined timing schedule, closes and opens circuits to apply testing voltages to the apparatus to be tested. The stepping switch is preferably automatically advanced by electromagnetic means, and it preferably stops upon the failure of a circuit to meet the test, or upon failure of the testing voltages. Signal devices are included in and controlled by the testing apparatus, for indicating the characteristics of the circuits under test.

These and other objects and advantages of the invention will become apparent from the following detailed description of one embodiment thereof, reference being had to the accompanying drawings wherein Figs. 1 and 2, when placed side by side, with Fig. 1 at the left of Fig. 2, show diagrammatically a complete testing circuit in accordance with the invention.

In order to simplify the drawings and to facilitate the tracing of the connections from the selector switches and the operation of the circuits connected thereto, a number of the conductors from the selector switches to other apparatus have been broken away, and a code of reference characters is employed which identifies each conductor as being associated with a particular selector switch. Thus, all of the conductors connected to the selector switch 41 are numbered between 100 and 125 inclusive; all those connected to the switch 42 are numbered between 200 and 225 inclusive; the connections to switches 43, 44, 45, 46 are identified by corresponding numbers in the 300, 400, 500 and 600 series respectively.

At the right of Fig. 1, the broken leads from the selector switches are continued. They are arranged in consecutive groups according to brush positions, rather than in the order in which the selector switches are arranged. Thus the conductors from the second terminal of each switch are grouped together, and the conductors from the third terminals are grouped immediately below those just mentioned.

Power circuits

Referring now to the drawings, in which like reference numerals are employed to designate corresponding parts throughout the several views, and particularly to Fig. 2, the reference numerals 10 and 11 indicate batteries, preferably twenty-four volts each. The positive terminal of one battery is connected to the negative of the other. The other end of the battery 10 is connected to a ground conductor 16. A key 12 has two normally open contacts. One spring of one of the normally open contacts is connected to the other end of the battery 11, and the other spring of that contact is connected to the conductor 15. One spring of the other normally open contact of the key is connected to the connection between the batteries 10 and 11, and the other spring of that contact is connected to the conductor 14. Thus, when the key 12 is closed, a potential difference of twenty-four volts is produced between conductor 14 and ground 16 by the battery 10, and a potential difference of forty-eight volts is produced between conductor 15 and ground 16 by the series connection of batteries 10 and 11.

In addition to the above described direct current circuits, it is desirable to have in the test set a source of alternating current, preferably of a potential of five hundred volts. The terminals 20 are provided, for connection to any suitable source of alternating current, such as a power line carrying alternating current at one hundred ten or two hundred twenty volts. The terminals 20 are connected to the primary winding 21 of a transformer 22 through the armature 24 of a relay 25. The winding of the relay 25 is connected to the forty-eight volt circuit comprising the conductors 15 and 16, so that when the key 12 is closed, the armature of the relay will be actuated to close the primary circuit of the transformer. The primary winding 21 of the transformer 22 may be tapped so that the transformer ratio may be varied to obtain the desired voltage in the secondary 28. Conductors 29 and 30 forming the alternating current circuit of the test set are connected to the secondary winding 28. The relay 25 and all other relays disclosed in the drawings are shown with their magnet windings deenergized, and in the description of apparatus and electrical circuits, excepting the description of the operation of the test set, the contacts associated with the armatures of the relays are described with reference to deenergized relay coils.

General description of selector switches

As shown in Fig. 1, there are provided the selector switches 41, 42, 43, 44, 45 and 46, preferably six in number, each of which comprises a bank of terminals, preferably twenty-six in number, and a contact brush, the brushes being designated by the reference numerals 51, 52, 53, 54, 55 and 56. Each of the selector switch brushes is of conductive material and is rotatably mounted at its central point. Each of the banks of terminals is arranged in a semi-circle, so that the brush may successively engage all of the terminals in the bank twice during one complete rotation thereof. The six brushes are mounted on a shaft to operate together and in unison, and are insulated from each other.

First selector switch

Referring to the selector switch 41, the first terminal thereof is connected to the brush 51, and also, by a conductor 100, through the winding of a stepping magnet 60 to the forty-eight volt conductor 15. The purpose of the stepping magnet 60 is to advance the brushes of the selector switches, and the circuit through the magnet is completed by engagement of the brush 51 with any terminal to which ground is connected. The second terminal of the bank is connected by a conductor 101 to one side of a normally open key 61, the other side of which is connected by a conductor 62 to the ground conductor 16. The third terminal is connected by a conductor 102 through the normally closed contact 64 of a slow operating relay 65 to ground 16. The fourth terminal is connected by a conductor 103 through the normally closed contact 67 of a slow operating relay 68 to the conductor 16. The seventh terminal is connected by a conductor 106 through the normally closed contact 69 of a slow operating relay 70 to ground 16. The eighth terminal is connected by a conductor 107 through one side of a normally closed double key 72, through a normally closed contact 73 of a slow operating relay 74 to ground 16.

A conductor 108 connects the ninth terminal through a normally closed key 75 and through a normally closed contact 76 of the slow operating relay 77 to ground. The eleventh terminal is connected by a conductor 110 through the normally closed key 79 and the normally closed contact 76 of the relay 77 to ground 16. A conductor 111 connects the twelfth terminal through the normally closed contact 81 of a relay 82 and through the normally closed key 83 to ground 16. The thirteenth terminal is connected by a conductor 112 through one side of the normally closed key 72 and through the normally closed contact 73 of the relay 74 to ground. A conductor 113 connects the fourteenth terminal through the normally closed key 85 and through the normally closed contact 76 of relay 77 to ground 16. The twenty-fourth terminal is connected by a conductor 123 through a normally closed key 86 and through the normally closed contact 76 of the relay 77 to ground 16. The twenty-fifth terminal is connected by a conductor 124 through a normally closed key 87 and through the normally closed contact 73 of the relay 74 to ground. The twenty-sixth terminal is connected by a conductor 125 through a normally closed key 89 and through the normally closed contact 76 of the relay 77 to ground.

It will be observed that each of the terminals of the selector switch heretofore described are connected to the ground conductor 16. It is necessary, for the operation of the stepping magnet 60 to advance the brushes, that all of the terminals be connected to ground. For this reason, in the drawings, the fifth and sixth terminals are connected to the conductor 103, the tenth, fifteenth, seventeenth, nineteenth, twenty-first, and twenty-third terminals are connected to the conductor 107, and the sixteenth, eighteenth, twentieth and twenty-second terminals are connected to the conductor 108. In practice, the fifth and sixth terminals may be connected through relays and circuits to be tested similar to the circuit of conductor 103, instead of being connected to 103, as shown. Each of the other points above enumerated, instead of connecting directly to the conductors 107 or 108, may be connected through a normally closed key, such as the 75 associated with the conductor 108, to the conductor 107 or 108, and then to the normally closed contact 73 or 76 respectively.

Second selector switch

Referring now to the selector switch 42, the first terminal is connected to the brush 52 and also by a conductor 200 to the ground 16 which grounds the brush. The third terminal is connected by a conductor 202 through the winding of the relay 65 to the conductor 302 which is connected to the third terminal of the selector switch 43. The fourth terminal of the switch 42 is connected by a conductor 203 through the winding of the relay 68 and through a circuit represented schematically at 92 which may be any circuit portion of a telephone subscriber's set, such for example, as the transmitter circuit, to the conductor 303 which is connected to the fourth terminal of the selector switch 43. A normally open key 66 is connected across the circuit of the winding of the relay 68, whereby the circuit 92 may be short circuited and the relay operated if a flow of current is not obtained through the circuit 92. The seventh terminal of the switch 42 is connected by a conductor 206 through the winding of the relay 70 and through a circuit represented schematically at 93 which may be any circuit portion of a telephone subscriber's set, to the conductor 306 which is connected to the seventh terminal of the switch 43. A normally open key 71 is connected across the circuit of the winding of the relay 70, whereby the circuit 93 may be short circuited and the relay operated if a flow of current is not obtained through the circuit 93. A conductor 211 connects the twelfth terminal of the switch 42 through the winding of a relay 95 to the twenty-four volt conductor 14. The twenty-fourth terminal is connected by a conductor 223 to a conductor 250, the purpose of which will be described in connection with the receiver hook operating mechanism.

Third selector switch

The selector switch 43 has its first terminal connected to the brush 53 and by a conductor 300 through the normally closed contact 130 of an alternating current relay 131 and through the normally closed contact 132 of a similar relay 133 to the twenty-four volt conductor 14. A conductor 301 connects the second terminal through a lamp 134 to a conductor 601 which is connected to the second terminal of the selector switch 46. The third terminal of the switch 43 is connected by the conductor 302 in the circuit of the winding of the relay 65 which has previously been described. The fourth terminal is connected by the conductor 303 in the circuit of the winding of the relay 68, as previously described. The seventh terminal is connected by a conductor 306 in the circuit of the relay 70, as previously described. The eighth terminal is connected by a conductor 307 through the normally closed contact 135 of the relay 77 and through the winding of the relay 136 to ground 16. A normally open contact 140 operated by the relay 136 connects the twenty-four volt conductor 14 through the winding of the relay 74 to ground 16. A conductor 308 connects the ninth terminal through the normally closed contact 138 of the relay 74 and through the winding of the relay 139 to ground. The relay 139 operates a normally open contact 141 which connects the twenty-four volt conductor 14 through the winding of the relay 77 to ground 16. The eleventh, fourteenth, twenty-fourth and twenty-sixth terminals are connected by conductors 310, 313, 323 and 325, respectively, to the conductor 308, the circuit of which is described in the preceding sentence. The thirteenth and twenty-fifth terminals are connected by conductors 312 and 324, respectively to the conductor 307, the circuit of which has previously been described.

In the drawings, the terminals not heretofore described, of the selector switch 43, have been treated in a manner similar to the treatment of corresponding terminals of selector switch 41. Thus the fifth and sixth terminals have been connected to the conductor 303, whereby deenergization of the stepping magnet would be accomplished through the relay 65. The remaining terminals are, in practice, alternately connected to the conductors 307 and 308, as shown in the drawings, to operate the relays 136 and 139, respectively.

Fourth selector switch

In the selector switch 44, the first terminal is connected to the brush 54 and is also connected by a conductor 400 through the winding of the alternating current relay 133 to the conductor 29. The second terminal is connected by a conductor 401 to a circuit which is employed to test the operation of the alternating current relays 131 and 133 and which will presently be described. A conductor 408 connects the ninth terminal of the selector switch 44 to the contact spring 145 of the receiver hook key of a telephone subscriber's set to be tested. The conductor 410 connects the eleventh terminal to the contact spring 146 of the receiver hook key and also to the coin collector operating circuit 147. The fourteenth terminal is connected by a conductor 413 to the circuit 92 hereinbefore mentioned. The conductor 423 connects the twenty-fourth terminal to the circuit 93. The conductor 424 connects the twenty-fifth terminal to the opposite side of the circuit 93.

Fifth selector switch

In the selector switch 45, the first terminal is connected to the brush 55 and also by the conductor 500 through the winding of the alternating current relay 131 to the conductor 30. The second terminal is connected by a conductor 401 to the circuit for testing the operation of the relays 131 and 133 which has been mentioned above and which will presently be described in detail. The ninth, eleventh, fourteenth and twenty-fifth terminals are connected by the conductors 508, 510, 513 and 524, respectively, to the metal housing 148 of the subscriber's set under test, the housing being normally insulated from the telephone circuits. A conductor 523 connects the twenty-fourth terminal to the circuit 92.

Sixth selector switch

Referring now to the selector switch 46, the first terminal is connected to the brush 56 and also by the conductor 600 to the ground conductor 16. The second terminal is connected by a conductor 601 to the lamp 134 as previously set forth. The fourth, seventh, ninth, eleventh, twelfth, fourteenth, twenty-fourth and twenty-fifth terminals of the selector switch 46 are connected by conductors 603, 606, 608, 610, 611, 613, 623 and 624, respectively, through the lamps 150, 151, 152, 153, 154, 155, 156 and 157, respectively to the twenty-four volt conductor 14.

Receiver hook operating mechanism

A portion of a coin operated telephone subscriber's set which may be tested with the apparatus described herein is shown schematically in Fig. 2. The portions of the telephone subscriber's set that are connected to the selector switches have previously been mentioned and identified by reference characters. The usual telephone subscriber's set includes a receiver hook 190 or other member operating a key for putting the telephone in operative condition. The upward movement of the receiver hook, caused by the lifting of a receiver or other weight, closes a key to make contact between springs 143 and 145, and between springs 144 and 146. In the making of continuity tests on portions of the subscriber's set circuits including the receiver hook key, it is necessary to have the hook raised in order that the key may be closed, while in the making of certain breakdown tests with the high alternating voltage, it is desirable to have the key open. It is therefore desirable to have means for raising and lowering the hook at the proper intervals.

In Fig. 2 is shown the apparatus by means of which the raising and lowering of the hook is controlled. A weight (not shown) capable of pressing the hook downward is associated with a rotatable shaft 228 which is geared to and operated from a motor 230. Mounted on the rotatable shaft which controls the receiver hook weight are cams 231 and 232 operable to open and close the keys 233 and 234 respectively. The cam 231 and key 233 control the movement of the hook upwardly, while the cam 232 and key 234 control downward movement of the hook. In the drawings the hook 190 is shown in its upper position and the cams and associated keys are shown in accordance with this condition, the key 233 being open, and the key 234 being closed.

The motor 230 has one side connected by a conductor 236 to the forty-eight volt conductor 15, and the other side connected to the normally open contacts 237 of a relay 238. The terminals with which the contacts are engageable are connected by a conductor 240 to ground 16. The winding of the relay 238 is connected by a conductor 241 to the twenty-four volt conductor 14, and by a conductor 242 to the normally open contacts 244 and 245 of a relay 246 and slow operating relay 247 respectively. The cam operated key 233 is connected by a conductor 250 with the normally open contact 251 of the relay 246, and by a conductor 252 with the winding of the relay 246, the opposite end of which is connected to the twenty-four volt conductor 14. The cam operated key 234 is connected by a conductor 254 to the normally open contact 255 of the relay 247 and by a conductor 256 to the winding of the relay 247, the opposite end of which is connected to the conductor 14. The terminals 257 with which the normally open contacts of the relays 246 and 247 are engageable are connected to the ground conductor 16. A manually operated normally open key 260 is connected by a conductor 261 to ground 14 and by a conductor 262 to the conductor 250 associated with the cam operated key 233. Also, a manually operated normally open key 264 is connected to the ground 16, and by a conductor 265 to the conductor 254 associated with the cam operated key 234. The purpose of these manually operated keys will hereinafter be described.

*Receiver hook switch testing apparatus*

In a coin operated telephone, it is desirable that upon raising the receiver hook, the contact between the springs 143 and 145 shall be made after engagement of the spring 146 with the spring 144, and upon lowering the hook, the contact between springs 143 and 145 shall break first. An arrangement for testing the sequence of the breakage of these contacts upon lowering of the hook 190 is shown in Fig. 2. As previously mentioned, the relay 95 has its winding connected to the conductor 211 and to the twenty-four volt conductor 14. The relay 95 is operable to close three normally open contacts, identified by the reference numerals 270, 271 and 272. There is also provided a relay 274 which has three normally open contacts, as shown at 275, 276 and 277. The normally open contact 270 is connected to ground 16, to one end of a resistance 279, and to normally open contacts 276 and 277 of relay 274. The normally open contact 271 is connected by a conductor 280 to the springs 144 and 145 of the receiver hook key, and through the winding of relay 82 to normally open contact 275 of the relay 274. The normally open contact 272 is connected to the twenty-four volt conductor 14, and by a conductor 281 to the contact spring 146 of the receiver hook key.

The relay 274 is provided with an operating winding 283 and a locking winding 284. The winding 283 has one end connected to the resistance 279 and to the terminal engaged by the normally open contact 275, and the other end connected by a conductor 286 to the spring 143 of the receiver hook key. The winding 284 has one end connected to the conductor 281 and the other end connected to the terminal engaged by the normally open contact 276. The make contact 277 is connected to the conductor 254, which connects the normally open contact 255 of the relay 247 to the cam operated key 234.

*Alternating current relay testing apparatus*

In the description of the connections to the selector switches 44 and 45, it has been mentioned that the conductors 401 and 501 connected to the second terminals of those switches are connected to a circuit for testing the alternating current relays 131 and 133. That circuit is shown in Fig. 2. The circuit consists of a plurality of normally open keys whereby non-operate, operate, and short circuit tests may be accomplished. The keys 160 and 161, 163 and 164, 166 and 167 are employed to apply non-operate, operate, and short circuit tests respectively, to the relay 133, while the keys 170 and 171, 173 and 174, 176 and 177 are employed to apply the same tests respectively to the relay 131. A conductor 180 connects one side of the normally closed contacts 130 and 132 of the alternating current relays 131 and 133 to one contact of each of the keys 161, 164, 167, 171, 174 and 177. The other contact of each of the keys 161, 164, and 167 is connected by a conductor 181 to the other side of the normally closed contact 130, so that when any one of the keys 161, 164, and 167 is closed, the contact 130 is short circuited. Similarly, the conductor 182 connects the other contact of each of the keys 171, 174 and 177 to the other side of the normally open contact 132, so that when any one of the keys 171, 174 and 177 is closed, the contact is short circuited.

The conductor 501, which has been mentioned in the preceding paragraph, is connected to one side of each of the keys 160, 163, 166, 170, 173, and 176, whereby one side of the alternating current from the transformer 22 is available at that side of the keys through the conductor 30, the winding of the relay 131, the conductor 500, the brush 55, and the conductor 501. The other side of each of the keys 160 and 170 is connected to the conductor 401 through the resistance 185, which is preferably of 250,000 ohms. The other side of each of the keys 163 and 173 is connected to the conductor 401 through the resistance 186 which is preferably of 125,000 ohms. The other side of each of the keys 166 and 176 is connected directly to the conductor 401. In this way the other side of the alternating current is supplied from the transformer 22 through the conductor 29, the winding of the relay 133, the conductor 400, the brush 54, and the conductor 401 directly to certain keys or through the proper resistances to others.

It will be understood that certain of the above described keys may be combined to be operated concurrently or successively, and that instead of single circuit keys, double throw keys having a plurality of pairs of contact springs may be provided. Thus the keys 160, 161, 170 and 171 may be replaced by a double throw key having two pairs of contact springs corresponding to the keys 160 and 161, and operable when the key is closed in one direction apply a non-operate test to the relay 133, and two pairs of contacts corresponding to the keys 170 and 171, and operable when the key is closed in the opposite direction to apply a non-operate test to the relay 131. Similarly, the keys for the operate test, and for the short circuit test, may be combined.

*General description of operation*

In the foregoing paragraphs the apparatus and circuit connections of the testing set have been described without reference to the operating relationships between the several parts or the operation of the testing set as a whole. The operation of the device and the tests accomplished at the several points on the selector switches will now be described. It is important, for a full and complete understanding of the operation of the testing set, that the connections to the brushes of the selector switches be clearly understood and kept in mind and they are therefore here repeated. The brush 51 of the selector switch 41 is connected to the forty-eight volt lead, through the winding of the stepping magnet 60. The brush 52 of the selector switch 42 is connected directly to ground. The brush 53 of the selector switch 43 is connected to the twenty-four volt line through the normally closed contacts of the alternating current relays 131 and 133. The brush 54 of the selector switch 44 is connected to one side of the alternating current source through the winding of the relay 133. The brush 55 of the selector switch 45 is connected to the other side of the alternating current source through the winding of the relay 131. The brush 56 of the selector switch 46 is connected directly to ground. Since the first terminal of each selector switch is employed to connect the brush to the proper conductor, as outlined above, the second terminal of each selector switch is the first operating position and the operation of the testing set will be described with reference to brushes initially occupying the first operating position.

In the operation of the test set as described in the following paragraphs, continuity tests are made at the third and sixth positions, and breakdown tests are made at the eighth, tenth, thirteenth, twenty-third, and twenty-fourth positions. The first position is for starting and for checking the operation of the alternating current relays. The eleventh position is employed for checking the sequence of operation of the receiver hook key. The remaining positions two, seven, twelve, and twenty-five are idle positions, no tests being made, and the apparatus being operative only to advance the brushes to the next position.

Of importance is the use of slow operating relays, which are identified as such throughout the description of the test set and its operation. It will be observed, as the description of the operation of the test set is followed that the energization of these relays occurs simultaneously with the operation of other apparatus or the application of a testing voltage, which may require a time interval before the operation of the relay. The retarded action of a slow operating relay provides the desired time interval.

First position

After a coin operated telephone or other apparatus to be tested has been properly connected to the testing set, the power switch 12 may be closed to supply the proper voltages to the testing set. The closure of the power switch 12 causes the operation of the relay 25 which connects the primary of the transformer 22 to the alternating current power line and supplies an alternating voltage to the brushes 54 and 55. The brush 51 is connected to the key 61 which is normally open, thereby preventing flow of current through the stepping magnet. There is no connection to the brush 52 in the first position. The brush 53 is connected by the conductor 301 through the lamp 134 and through the conductor 601 to the first position of the selector switch 46 and to ground, and the lamp is thereby lighted, indicating that the twenty-four volt circuit is in proper order and that the set is ready for operation. The brushes 54 and 55 are connected by the conductors 401 and 501 respectively to the system of keys for testing the operation of the alternating current relays 131 and 133 and the operation of those relays may be tested in the following manner.

Closure of the keys 160 and 161 completes the alternating current circuit through the relays 131 and 133 and through the resistance 185 and also short circuits the normally closed contact 130 of the relay 131. If the relay 133 is properly adjusted, it will not operate and the lamp 134 will remain lighted. If the relay is not properly adjusted it will operate through the resistance 185 and the lamp 134 will be extinguished by the opening of the normally closed contact 132. The keys 170 and 171 may be employed in the same manner to make the same test upon the relay 131. In the same manner the keys 163, 164, 173 and 174 may be employed to make an operate test upon the relays. The alternating current is then supplied through the resistance 186 which is of relatively low resistance as compared with the resistance 185 and will permit the relays to operate if they are properly adjusted. As before, operation of the relays will cause the lamp 134 to be extinguished, but if either fails to operate the lamp will remain lighted. The keys 166, 167, 176 and 177 are employed in the same manner to apply a short circuit test for sticking of the relays 131 and 133. These keys connect the full alternating voltage to the winding of the relays without any intervening resistance. The relays will operate and the lamp 134 will be extinguished and if the armatures stick the lamp will not relight upon restoration of the keys to their normal position. After the alternating current relays have been properly adjusted, the key 61 may be closed, thereby energizing the stepping magnet and causing its armature to be operated and held. When the key is opened, the circuit through the stepping magnet is broken and the armature is released, causing the brushes to advance to the second position.

Second position

In the second position the brush 51 closes the stepping magnet circuit through the conductor 102 and the normally closed contact of the relay 65 and causes the armature to operate and hold. The brush 52 connects one side of the winding of the slow operating relay 65 to ground through the conductor 202, and the brush 53 connects the other side of the winding to the twenty-four volt line through the conductor 302. The winding is thus energized and the relay is operated to open the normally closed contact 64 which opens the stepping magnet circuit thereby releasing the armature and causing the brushes to advance to the third position. No tests are made in the second position.

Third position

In the third position the brush 51 completes the stepping magnet circuit through the conductor 103 and the normally closed contact of the relay 68, thus operating and holding the armature thereof. The brushes 52 and 53 complete a circuit through the conductors 203 and 303, through the winding of the relay 68 and through the circuit 92 under test for continuity. There are no connections in the third position of selector switches 44 and 45. The brush 56 completes a circuit through the conductor 603 and the lamp 150, which lights. If the circuit 92 under test is continuous, the relay 68 will be energized to open the normally closed contact 67, thereby disconnecting the stepping magnet winding to release its armature and advance the brushes to the fourth position. If the circuit 92 is not continuous, no current will flow through the winding of the relay 68, the stepping magnet will remain energized, and the brushes will remain in the third position. The brushes may then be advanced by closing the key 66 which completes the circuit through the winding of the relay 68 causing the stepping magnet to be deenergized. When the brushes advance from the third position, the lamp 150 will be extinguished.

The circuits for the fourth and fifth positions are similar to the circuits of the third operating position and similar apparatus not shown in the drawings may be operated in an identical manner to make continuity tests on other circuits of the telephone subscriber's set. In the drawings the fourth and fifth positions of the switches 41, 42 and 43 have been connected to the third position, so that the test of that position is conducted three times, whereas, in practice, those positions could be connected to other relays and circuits to make other continuity tests.

Sixth position

In the sixth position the last continuity test is made. The brush 51 completes the stepping magnet circuit through the conductor 106 and through the normally closed contact of the relay 70 to operate and hold the armature of the stepping magnet. The brushes 52 and 53 complete a circuit through the conductors 206 and 306, through the winding of the relay 70, and through the circuit 93 under test. The brush 56 completes a circuit through the conductor 606 and through the lamp 151, causing the lamp to be lighted. If the circuit 93 is continuous the relay 70 will be operated to release the stepping magnet armature as in the third position. If the circuit 93 is not continuous, the relay 70 may be energized by means of the key 71 to advance the brushes to the seventh position.

Seventh position

In the seventh position, the brush 51 completes a circuit through the conductor 107 and through one side of the normally closed key 72, through the normally closed contact 73 of the slow operating relay 74 to energize the stepping magnet and cause its armature to be held. There is no connection in the seventh position of the selector switch 42. The brush 53 and conductor 307 complete a circuit through the normally closed contact 135 of the relay 77 and through the winding of the relay 136, thus energizing the relay and causing the normally open contact 140 to close. The closure of the contact 140 completes the circuit through the winding of the relay 74, thus energizing the relay and opening the normally closed contact 73 which disconnects the stepping magnet from the forty-eight volt source. This will cause the armature of the stepping magnet to be released and the brushes will be advanced to the eighth position. The advance of the brushes breaks the circuit through the relays 74 and 136, and they restore to normal. There are no connections to the selector switches 44, 45 or 46 in the seventh position. If either of the relays 74 or 136 fail to operate, the stepping magnet circuit may be broken by opening the normally closed key 72, thus advancing the brushes. No tests are made in this position.

Eighth position

In the eighth position, the first breakdown test is made. The brush 51 and conductor 108 complete a circuit through the normally closed key 75 and through the normally closed contact 76 of the slow operating relay 77 to energize the stepping magnet and operate and hold the armature thereof. There is no connection to the selector switch 42 in the eighth position. The brush 53 and conductor 308 complete a circuit through the normally closed contact 138 of the relay 74 and through the winding of the relay 139, causing the relay to operate and close the normally open contact 141. The closure of this contact completes the circuit of the winding of the relay 77 to operate the relay and open the normally closed contact 76 which opens the stepping magnet circuit and causes the brushes to be advanced to the ninth position. The brush 54 is connected by the conductor 408 to the contact spring 145 of the receiver hook key. The hook 190 is in its upper position so that the spring 145 is in engagement with the spring 143 and the circuits connected with these keys are thus connected to one side of the alternating voltage. The brush 55 and conductor 508 connect the other side of the alternating voltage to the metallic housing of the subscriber's set under test which is normally insulated from the telephone circuits. The brush 56 and conductor 608 complete a circuit through the lamp 152 lighting the lamp. If the receiver hook key is in proper condition, it will be well insulated from the metallic housing and no alternating current will flow through the circuit. The relays 131 and 133 will remain inoperative and normally closed contacts will remain closed and the operation of the relays 77 and 139 will proceed, as described above, to advance the brushes to the ninth position.

However, if the apparatus under test breaks down and permits current to flow, the alternating current relays 131 and 133 or either of them will operate to open the twenty-four volt line which supplies voltage to the brush 53. The relays 77 and 139 will thus be prevented from operating and the lamp 152 will remain lighted. Under these circumstances the brushes may be advanced to the ninth position by operating the key 75 which opens the stepping magnet circuit and causes its armature to be released.

A feature of special importance in the testing set is the arrangement of the relays 77, 139, 74 and 136, the operation of which has been described in connection with the seventh and eighth positions. When the chain of relays 77 and 139 is employed for interrupting the stepping magnet circuit, the winding of the relay 139 is energized through a normally closed contact of the relay 74. Thus it is necessary for the relay 74 to restore to inoperative condition, after it has been operated on a previous position, in order for the relays 77 and 139 to operate. Similarly, when the relays 74 and 136 are called into operation, the relay 77 must be inoperative in order to complete the circuit through the relay 136.

Ninth position

The ninth position is employed for a breakdown test similar to that conducted in the eighth position and the connections for this position have not been shown with the exception of the connection from the brush 51 to seventh position of the switch 41, and the connection of the brush 53 to the seventh position of the selector switch 43 and from there through the normally closed contact 135 to the winding of the relay 136, which connections have been described. The operation of the apparatus in the ninth position is identical with its operation in the eighth position except that the relays 74 and 136 are employed as in the seventh position for operating the stepping magnet instead of the relays 77 and 139.

Tenth position

In the tenth position the brush 51 and conductor 110 complete the stepping magnet circuit through the key 79 and through the normally closed contact 76 of the relay 77. There is no connection to the selector switch 42 in the tenth position. A strap connects the tenth position of the selector switch 43 to the eighth position of that switch and the brush 53 is thus connected to the normally closed contact 138 of the relay 74 and from there to the winding of the relay 139. The operation of the relays 77 and 139 is the same as their operation in the eighth position described above. The brush 54 is connected by the conductor 410 to the contact spring 146 of the receiver hook key which engages the contact spring 144 and is also connected to the coin collector apparatus 147. The brush 55 is connected by the conductor 510 to the housing 148 of the subscriber's set. If the apparatus under test does not break down the relays 77 and 139 will operate to advance the brushes as outlined in connection with the eighth position. If the apparatus under test does break down the relays 131 and 133 will be operated to open the twenty-four volt circuit and prevent the operation of the relays 77 and 139, and the stepping magnet may then be deenergized to release its armature and advance the brushes, by opening the key 79. The circuit of the lamp 153 is completed by the brush 56 and conductors 610 and this lamp remains lighted while the brushes are in the tenth position and is extinguished when they advance to the eleventh position.

*Eleventh position*

The eleventh position is employed to test the sequence of separation of the two pairs of contacts in the receiver hook key when the hook is lowered. In this position the brush 51 and conductor 111 connect through the normally closed contact 81 of the relay 82, through the normally closed key 83 to ground to energize the stepping magnet and operate and hold its armature. The brush 52 and conductor 211 complete the circuit through the winding of the relay 95 to close the normally open contacts 270, 271 and 272. The contact 272 connects the twenty-four volt battery to one end of the locking winding 284 of the relay 274, and also through the contact springs 146 and 144 of the receiver hook key, through the then closed contact 271, through the winding of the relay 82 to the normally open contact 275 of the relay 274. It also connects the battery through the springs 145 and 143 of the receiver hook key, through the winding 283 of the relay 274 and through the resistance 279 to ground, thus completing the circuit through this winding and operating the relay 274. The operation of the relay 274 serves as a check on the continuity of the circuit through the contact springs 143 and 145, since the relay would not operate if there should be discontinuity in the circuit. The relay 274, when energized, closes the normally open contacts 275, 276 and 277. The contact 275 connects ground to the winding of the relay 82, thus completing the circuit of that relay, but its winding is in parallel with the winding 283 of the relay 274, and the relay 82 is so adjusted that it will not operate when the winding 283 is energized. The contact 276 connects ground to the locking winding 284 of the relay 274, thus energizing that winding to hold the relay operative after the winding 283 is deenergized as hereinafter explained. The contact 277 connects ground through the cam operated key 234 and through the winding of the slow operating relay 247 to the twenty-four volt battery line 14.

Upon the completion of the circuit through the contact 277, the relay 247 is energized to close the normally open contacts 245 and 255. The contact 245 connects ground through the winding of the relay 238 to the twenty-four volt line, thus energizing that relay. The relay 238 operates to close the normally open contacts 237, thus connecting ground through the circuit of the motor 230, which rotates to accomplish the double purpose of lowering the receiver hook weight and rotating the cams 231 and 232 to open the key 234 and close the key 233. When the motor 230 has rotated the cam shaft through one half revolution, which is sufficient to lower the weight and hook, the cam operated key 233 closes, and the cam operated key 234 opens. The opening of this key removes ground from the winding of the relay 247, thus releasing and opening the contacts 245 and 255 to deenergize the relay 238 and open the circuit of the motor 230.

The downward movement of the hook 190 opens the pair of contacts of the key associated therewith. If the springs 143 and 145 separate first, which is the proper sequence, the circuit of the winding 283 of the relay 274 is opened, and that winding is thereby deenergized, although the locking winding 284 will keep the relay operative. When the winding 283 is deenergized the winding of the relay 82, which is in parallel therewith becomes operative to open the normally closed contact 81, thus breaking the stepping magnet circuit to release the armature thereof and step the brushes to the twelfth position. The advance of the brush 52 to the twelfth position removes ground from the winding of the relay 95, and that relay will release to open the three contacts associated therewith. Since the relay 274 can only be energized through the contacts of the relay 95, the contacts 275, 276 and 277 will also be opened.

If, in the lowering of the hook 190, the springs 144 and 146 should separate before the springs 143 and 145, the circuit through the winding of the relay 82 and also through the winding 283 of the relay 274 will be opened and the relay 82 will not operate to open the contact 81. The stepping magnet will remain energized and will hold its armature, thus preventing the advance of the brushes. The brushes may then be advanced by opening the normally closed key 83, which interrupts the stepping magnet circuit.

It may happen that the receiver hook key contacts open before the cam shaft has completed its one half revolution. The ground to the cam operated key that is provided through the contact 277 would then be removed, and the relays 247 and 238 would release to interrupt the operation of the motor. The prevent this, the contact 255 of the relay 247 is connected to ground so that when the relay 247 is operated, an additional ground is supplied to the cam 234 from the contact 255, so that the operation of the motor cannot be interrupted until the cam operated key 234 opens.

The operation of the motor is not dependent entirely upon the closure of the contact 277 to supply ground to the key 234. A manually operated key 264 is provided, and when this key is closed ground is connected to the cam key 234 to set in operation the relays 247 and 238. The motor cannot be operated either from the key 264 or from the contact 277 unless the cam key 234 is closed.

The only brush that completes a circuit in the eleventh position, other than the brushes 51 and 52 heretofore described, is the brush 56 which completes a twenty-four volt circuit through the lamp 154. The lamp remains lighted if the brushes fail to advance to the next position, and it is extinguished when they are advanced, either by operation of the relay 82 or by manual opening of the key 83.

*Twelfth position*

The twelfth position is similar to the seventh position previously described in that the connections to the selector switches are substantially the same and no test is made, the principal purpose being to set in operation the relay systems employed in the subsequent tests in order that the apparatus may function in accordance with a desired timing schedule. The brush 51 and conductor 112 complete a circuit through one side of the key 72 and through the normally closed contact 73 of the relay 74 to ground to energize the stepping magnet to cause the armature thereof to be operated and held. There is no connection to the selector switch 42 in the second position. The twelfth position of the selector switch 43 is connected by a strap to the seventh position of that switch so that the brush 53 is connected through the normally closed contact 135 of the relay 77 and through the winding of the relay 136 to ground to energize the latter relay. This relay, and also the relay 74 operate as in the seventh position to open the normally closed contact 73 and release the stepping magnet to advance the brushes. There are no connections to the selector switches 44, 45 or 46 in this position.

*Thirteenth position*

The thirteenth position is a testing position in which a breakdown test is made. The brush 51 is connected through the conductor 113 and the key 85 and through the normally closed contact 76 of the relay 77 to ground to energize the stepping magnet. There is no connection to the selector switch 42 in this position. The thirteenth position of the selector switch 43 is connected by a strap to the eighth position thereof so that the brush 53 is connected through the normally closed contact 138 of the relay 74 to the winding of the relay 139. The operation of the relays 77 and 139 to affect the release of the stepping magnet is the same as that which has been described in connection with the eighth position. The brush 54 is connected by the conductor 413 to the circuit 92 and thus applies one side of the alternating voltage to that circuit. The brush 55 is connected by the conductor 513 to the metallic housing of the coin operated telephone and applies the other side of the alternating voltage to that housing. As described in connection with the eighth position, if the system breaks down and alternating current flows in the apparatus under test, the relays 131 and 133 operate to open the twenty-four volt circuit whereby the relays 77 and 139 are prevented from releasing the stepping magnet. If these relays fail to operate the stepping magnet may be released to advance the brushes to the next position by opening the normally closed key 85. The brush 56 and conductor 613 complete a circuit through the lamp 155 which remains lighted while the brushes are in the thirteenth position and is extinguished when they are advanced.

The positions numbering from fourteen to twenty-two, inclusive, are employed for conducting breakdown tests on circuits contained in the telephone subscriber's set and these tests and the operation of the mechanisms are identical with the tests conducted in the eighth and thirteenth positions. The even numbered positions of the selector switches 41 and 43 are connected to the seventh positions of those switches, and the odd numbered positions are connected to the eighth positions, to effect the advance of the brushes as in the seventh and eighth positions.

*Twenty-third position*

In the twenty-third position the brush 51 is connected by a conductor 123 through a normally closed key 86 and through the normally closed contact 76 of the relay 77 to ground for energizing the stepping magnet. The brush 52 is connected by the conductor 223 through the cam operated key 233 which was closed in the eleventh position and through the winding of the relay 246 to the twenty-four volt line. The relay 246 closes the normally open contacts 244 and 251 which connect ground through the winding of the relay 238 to the twenty-four volt line to energize the relay and close the contacts 237. These contacts supply ground through the circuit of the motor 230 to the forty-eight volt line and the motor operates to rotate the cam shaft to raise the receiver hook 190 and to turn the cams 231 and 232 through one half revolution so that the key 233 may open and the key 234 may close, thus putting the apparatus in its initial condition. The opening of the cam operated key 233 disconnects the ground from the relay 246 and releases the contacts 244 and 251 which open to release the relay 238 and thus stop the motor 230. The operation of the motor to raise the hook 190 is not dependent entirely upon the completion of the circuit through the brush 52 to supply ground to the key 233. A manually operated key 260 is provided and this key may be closed to connect ground to the cam operated key 233 and thereby to set in operation the relays 246 and 238 to operate the motor. The motor can not be operated either from the brush 52 or from the key 260 unless the cam operated key 233 is closed.

Since the position 23 is an odd numbered position, the selector switch terminal that is associated with that position is strapped to the eighth position and from there to the normally closed contact 138 of the relay 74 so that the brush 53 is connected to the winding of the relay 139. The operation of the relays 77 and 139 is the same as in the eighth position. The brush 54 and conductor 423 connect one side of the alternating voltage to the circuit 93 and the brush 55 and conductor 523 connect the other side of the alternating voltage to the circuit 92 so that a breakdown test is obtained between the two circuits. If the apparatus breaks down and permits a flow of current, the relays 131 and 133 operate to prevent the relays 77 and 139 from operating, thus holding the brushes in the twenty-third position. The brushes may be advanced from that position by opening the key 86 which opens the stepping magnet circuit and releases the armature thereof. The brush 56 and conductor 623 complete a circuit through the lamp 156 which remains lighted while the brushes are in the twenty-third position and is extinguished when they are advanced.

*Twenty-fourth position*

In the twenty-fourth position the brush 51 and conductor 124 complete a circuit through the key 87 to energize the stepping magnet. There is no connection to the selector switch 42 in the twenty-fourth position. The brush 53 engages the twenty-fourth position of the selector switch 43 which is strapped to the seventh position and the brush is thus connected to the normally closed contact 135 of the relay 77. The relays 74 and 136 operate as described in connection with the seventh position. The brush 54 is connected by the conductor 424 to the circuit 93 to apply one side of the alternating voltage thereto and the brush 55 is connected by a conductor 524 to the metallic housing of the telephone subscriber's set. If the system breaks down the relays 131 and 133 will operate in the manner previously described and if the relays 73 and 136 fail to operate to advance the brushes they may be advanced by operating the key 87.

*Twenty-fifth position*

In the twenty-fifth, which is the final position, the brushes engage the first terminal of each selector switch at one end and the last terminal at the other end. There is no connection to the last terminal of the switches 42, 44, 45 and 46. The brush 51 and conductor 125 complete a circuit through the key 89 and normally closed contact 76 of the relay 77 to energize the stepping magnet. The twenty-fifth position of the switch 43 is strapped to the eighth position and the brush is thus connected through the normally closed contact 138 of the relay 74 and through the winding of the relay 139 to ground, thus energizing the relay 139 to close the normally open contact 141 and energize the relay 77 to open the contact 76. The stepping magnet circuit is thus broken to release the armature and advance the brushes to the first position. If the relays 77 and 139 fail to operate the brushes may be advanced by opening the key 89 which opens the stepping magnet circuit.

The advance of the brushes to the first position completes the cycle of tests upon a telephone subscriber's set, which may then be disconnected from the testing set, and another telephone set may be connected thereto. If the circuits of a telephone set are in order, the tests are made automatically, and the testing set does not require attention after the key 61 has been closed and opened to put the set in operation. Not only are the tests applied successively, but the receiver hook key is opened and closed at the proper intervals. If any portion of the apparatus under test is faulty, the testing set will stop at the position to which the faulty circuit is connected, and it will not proceed until the fault has been eliminated or the proper manually operable key has been operated. Also, a continuing visible signal indicating the faulty circuit is given.

It is to be understood that the invention is not limited to the specific arrangement of parts and connections, and mode of operation as described, but that the testing set is capable of many changes, modifications, and substitutions, within the scope of the appended claims.

What is claimed is:

1. In a system for testing electrical circuits having contacts therein, testing devices, means for successively connecting a plurality of circuits to the testing devices, means for advancing the circuit connecting means, means for testing the sequence of operation of the contacts in said circuits, and means responsive to the existence of an unstandard condition in a circuit for preventing the operation of the advancing means.

2. In a system for testing electrical circuits, a plurality of circuits to be tested, a source of alternating current, a source of direct current, means for successively connecting a plurality of normally continuous circuits to the source of direct current, means for successively connecting normally disconnected conductive members to the alternating current source, means for advancing the connecting means, means responsive to a condition of discontinuity in the direct current circuit for preventing the operation of the advancing means, and means responsive to a condition of continuity in the alternating current circuit for preventing the operation of the advancing means.

3. In a system for testing electrical circuits, a source of direct current, a source of alternating current, means for successively connecting a plurality of circuits to the direct current source, means for thereafter successively connecting a plurality of circuits to the alternating current source, means for advancing the connecting means, and means responsive to the existence of an unstandard condition in a circuit for preventing the operation of the advancing means.

4. In a system for testing electrical circuits, a plurality of selector switches operable in unison, a stepping magnet energizable through one of the switches, a circuit to be tested connected to another of the switches, and means included in the circuit of the second mentioned switch for interrupting the circuit of the first mentioned switch for operating the stepping magnet to advance the switches.

5. In a system for testing electrical circuits, a plurality of selector switches operable in unison, a source of direct current, a stepping magnet energizable through one of the switches, a relay, a circuit to be tested connected through the relay to another of the switches, means for connecting the source of direct current to the switches, and means responsive to operation of the relay for interrupting the circuit through the stepping magnet for advancing the switches.

6. In a system for testing electrical circuits, a plurality of selector switches operable in unison, a source of direct current, a source of alternating current, a stepping magnet energizable through one of the switches, a system of relays energizable through the second switch, means associated with the system of relays and operable upon energization of the relays to interrupt the circuit through the stepping magnet, normally disassociated conductive elements connected to the source of alternating current, and means in the alternating current circuit responsive to a flow of current therein for interrupting the circuit through the second switch to prevent the operation of the system of relays.

7. In a system for testing electrical circuits having contacts therein, a plurality of circuits to be tested, selector means for successively connecting the circuits to testing voltages, automatic means for advancing the selector means, means for testing the sequence of operation of the contacts in said circuits, means responsive to the existence of an unstandard condition in a circuit under test for preventing the operation of the automatic means, and manually operated means for advancing the selector means upon failure of the automatic means.

8. In a system for testing electrical circuits having contacts therein, a source of current, a plurality of selector switches, a plurality of circuits to be tested connected to some of the switches, automatic means for advancing the switches, means for testing the sequence of operation of the contacts in said circuits, means responsive to the existence of an unstandard condition in a circuit under test for preventing the operation of the automatic means, and signal means connected to one of the selector switches for indicating the progress of the selector switches.

9. In a system for testing electrical apparatus, a plurality of selector means, means associated with one of the selector means for advancing all of the selector means, a source of current connected between two other of the selector means, a circuit to be tested connected between the second mentioned selector means for connecting the circuit to the current source, means in the circuit of one of the second mentioned selector means for interrupting the circuit of the first mentioned selector means to advance the selector means upon completion of a test, and for preventing the advance of the selector means upon the failure of the circuit to meet the test.

10. In a system for testing electrical circuits, a source of current, a relay, a resistance of sufficient value to prevent the operation of the relay, means for connecting the relay to the resistance and to the source of current, a resistance of lesser value to permit the operation of the relay, means for connecting the relay to the second mentioned resistance and to the source of current, and means for connecting the relay directly to the source of current.

11. In a system for testing electrical circuits, a source of alternating current, a plurality of relays connected thereto, a normally closed contact associated with each relay and operable upon energization of the winding thereof, a source of direct current, signal means connected through the normally closed contacts to the source of direct current, means for selectively applying predetermined tests to each of the relays, and means for short circuiting the normally closed contact of a relay not under test, to prevent interruption of the direct current circuit at that point.

12. In a system for testing telephone sets, means for testing a plurality of circuits in the set, means for successively connecting the circuits to the testing means, and means for opening and closing the receiver hook key of the telephone set at predetermined intervals.

13. In a system for testing telephone sets, means for testing a plurality of circuits in the set, means for successively connecting the circuits to the testing means, means for advancing the connecting means to successively connect the circuits, means for opening and closing the receiver hook key of the telephone set at predetermined intervals, means for testing the sequence of separation of the contacts during the opening of the key, and means responsive to an unstandard sequence condition in the key for preventing the operation of the advancing means.

14. In a system for testing telephone sets, means for testing a plurality of circuits in the set, means for successively connecting the circuits to the testing means, means for opening and closing the receiver hook key of the telephone set at predetermined intervals, and means for testing the sequence of separation of the contacts during the opening of the key.

WALTER L. ARNSTEIN.
VENE E. RINEHART.